(12) United States Patent  
Wu et al.

(10) Patent No.: US 7,804,681 B2
(45) Date of Patent: Sep. 28, 2010

(54) DISPLAY DEVICE AND COLLECTION DEVICE

(75) Inventors: Cho-Keng Wu, Taipei County (TW); Chun-Jung Tsuo, Taoyuan County (TW)

(73) Assignee: BenQ Corporation, Taipei (TW)

( * ) Notice: Subject to any disclaimer, the term of this patent is extended or adjusted under 35 U.S.C. 154(b) by 357 days.

(21) Appl. No.: 11/954,247

(22) Filed: Dec. 12, 2007

(65) Prior Publication Data

US 2008/0151482 A1 Jun. 26, 2008

(30) Foreign Application Priority Data

Dec. 21, 2006 (TW) .............................. 95148270 A

(51) Int. Cl.
*G06F 1/16* (2006.01)
(52) U.S. Cl. .................... 361/679.21; 361/727; 349/58; 349/59; 312/223.1; 312/223.2; 312/333
(58) Field of Classification Search ............ 361/679.21, 361/679.22, 679.49, 727; 349/58, 59
See application file for complete search history.

(56) References Cited

U.S. PATENT DOCUMENTS

| | | | | |
|---|---|---|---|---|
| 4,388,671 A | * | 6/1983 | Hall et al. ............... | 361/679.61 |
| 4,680,432 A | * | 7/1987 | Sugiyama et al. ........... | 200/5 A |
| 5,233,502 A | * | 8/1993 | Beatty et al. ........... | 361/679.09 |
| 5,347,630 A | * | 9/1994 | Ishizawa et al. ............. | 345/538 |
| 5,460,441 A | * | 10/1995 | Hastings et al. ............. | 312/298 |
| 5,490,039 A | * | 2/1996 | Helms .................... | 361/679.58 |
| 5,621,611 A | * | 4/1997 | Kizuya et al. .......... | 361/679.22 |
| 5,623,392 A | * | 4/1997 | Ma ....................... | 361/679.22 |
| 5,815,369 A | * | 9/1998 | Quesada .................. | 361/679.6 |
| 5,822,181 A | * | 10/1998 | Jung ....................... | 361/679.6 |
| 6,130,658 A | * | 10/2000 | Yamamoto et al. .......... | 345/102 |
| 6,385,051 B1 | * | 5/2002 | Perez et al. .................. | 361/759 |
| 6,475,087 B1 | * | 11/2002 | Cole .......................... | 463/20 |
| 6,867,827 B2 | * | 3/2005 | Cha et al. ...................... | 349/65 |
| 6,876,409 B2 | * | 4/2005 | Park et al. ...................... | 349/58 |
| 6,900,792 B2 | * | 5/2005 | Sun et al. .................... | 345/156 |
| 6,900,857 B2 | * | 5/2005 | Mai ............................. | 349/58 |
| 6,950,311 B1 | * | 9/2005 | DeCesare et al. ........... | 361/727 |
| 7,206,036 B2 | * | 4/2007 | Lin et al. ...................... | 349/58 |
| 7,453,685 B2 | * | 11/2008 | Lube ..................... | 361/679.27 |
| 7,492,421 B1 | * | 2/2009 | Kim et al. ..................... | 349/58 |
| 7,639,505 B2 | * | 12/2009 | Chen et al. ................. | 361/724 |
| 2002/0109802 A1 | * | 8/2002 | Cheng et al. .................. | 349/58 |
| 2002/0113919 A1 | * | 8/2002 | Liu et al. ...................... | 349/65 |
| 2004/0018870 A1 | * | 1/2004 | Cole ........................... | 463/20 |
| 2006/0034041 A1 | * | 2/2006 | Lo et al. ...................... | 361/681 |
| 2006/0080820 A1 | * | 4/2006 | Belote ..................... | 29/407.05 |
| 2006/0248713 A1 | * | 11/2006 | Vatanparast et al. ........... | 29/832 |
| 2006/0250540 A1 | * | 11/2006 | Wellhofer .................... | 349/58 |
| 2007/0064378 A1 | * | 3/2007 | Lo et al. ...................... | 361/681 |
| 2007/0263135 A1 | * | 11/2007 | Li .............................. | 349/58 |
| 2008/0170171 A1 | * | 7/2008 | Jing ............................ | 349/58 |

\* cited by examiner

*Primary Examiner*—Jayprakash N Gandhi
*Assistant Examiner*—Anthony Q Edwards

(57) ABSTRACT

A display device includes a circuit board, a pocket-shaped structure, a holder, and a display panel. The pocket-shaped structure includes a first side wall, a second side wall, a third side wall, a fourth side wall, and two support plates. The third side wall and the fourth side wall each has a hole. The two support plates are located beside the third side wall and the fourth side wall and form an empty space with the four side walls. The holder includes a first panel, a second panel, and two engaging slides. The two engaging slides are located at two extension arms of the first panel. When the holder is stored in the empty space, the first panel is supported on the two support plates and the two engaging slides are clamped within the holes of the third side wall and the fourth side wall.

13 Claims, 6 Drawing Sheets

DISPLAY DEVICE AND COLLECTION DEVICE

BACKGROUND OF THE INVENTION

1. Field of the Invention

The present invention relates to a display device and a collection device, which can be installed easily, and more particularly, to a display device and a collection device utilizing engaging slides clamped within holes to fix the collection device.

2. Description of the Prior Art

In the prior art, the manner of fixing internal circuit boards of an LCD display device and a metal back panel always adopts locking screws. It is not easy for users to pull out the circuit boards when processing operations of dismantling or exchanging electronic elements. By the way, the heavy and complicated manner of locking screws also wastes time. Besides, the screws themselves will increase cost of manufacturing LCD monitors.

SUMMARY OF THE INVENTION

The claimed invention provides a display device, which can be installed easily. The display device includes a circuit board, a pocket-shaped structure, a holder, and a display panel. The pocket-shaped structure includes a first side wall, a second side wall, a third side wall, a fourth side wall, and two support plates. The third side wall and the fourth side wall each has a hole. The two support plates are located beside the third side wall and the fourth side wall and form an empty space with the four side walls. The holder includes a first panel, a second panel, and two engaging slides. The first panel is used for holding the circuit board. The first panel includes two extension arms. The second panel is formed in one side of the first panel. The two engaging slides are located at the two extension arms of the first panel. The display panel is installed in one side of the first panel and coupled to the circuit board for displaying images according to image signals transmitted from the circuit board. When the holder is stored in the empty space, the first panel is supported on the two support plates and the two engaging slides are clamped within the holes of the third side wall and the fourth side wall.

The claimed invention provides a collection device, which can be installed easily. The collection device includes a pocket-shaped structure and a holder. The pocket-shaped structure includes a first side wall, a second side wall, a third side wall, a fourth side wall, and two support plates. The third side wall and the fourth side wall each has a hole. The two support plates are located beside the third side wall and the fourth side wall and form an empty space with the four side walls. The holder includes a first panel, a second panel, and two engaging slides. The first panel is used for holding a circuit board. The first panel includes two extension arms. The second panel is formed in one side of the first panel. The two engaging slides are located at the two extension arms of the first panel. When the holder is stored in the empty space, the first panel is supported on the two support plates and the two engaging slides are clamped within the holes of the third side wall and the fourth side wall.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
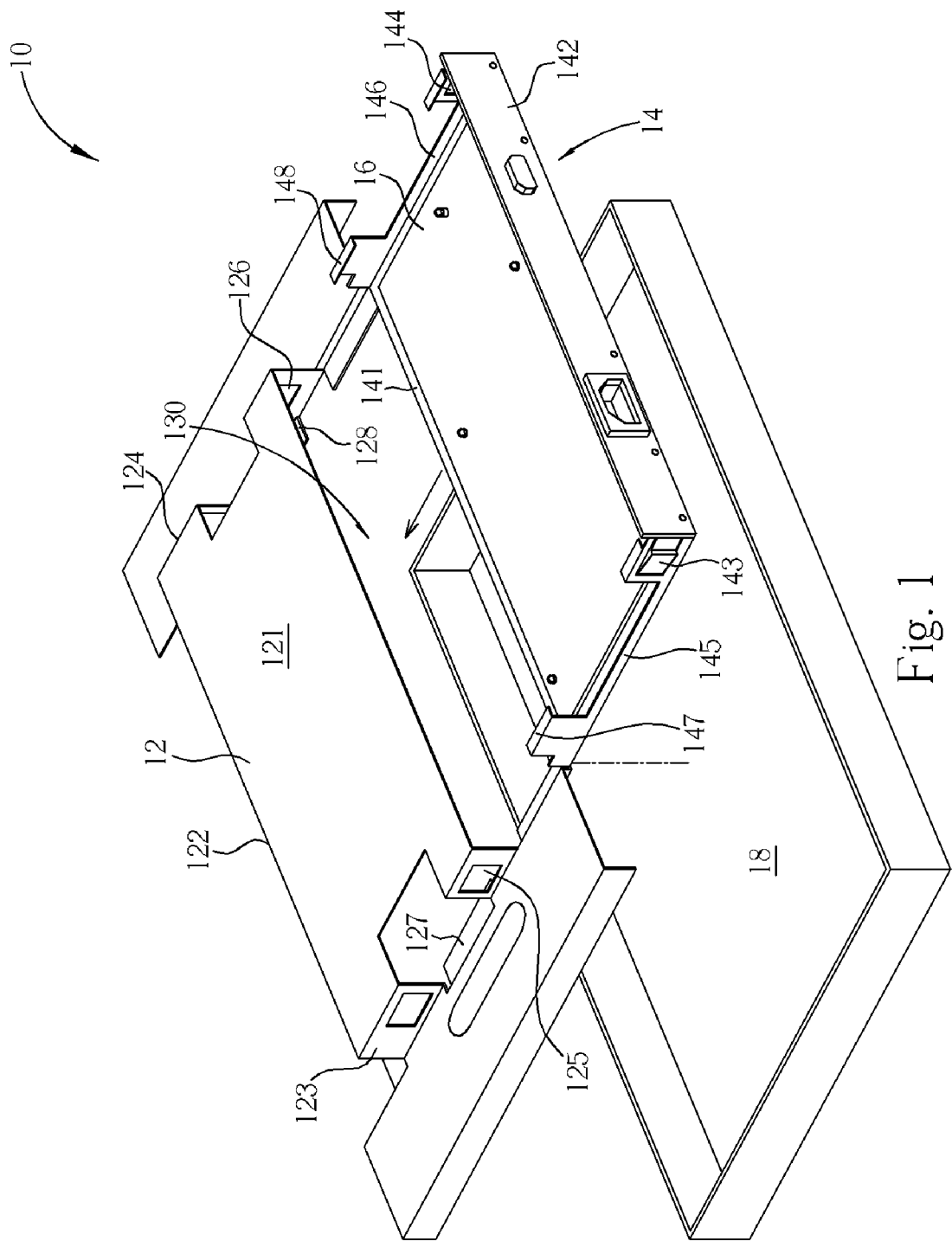
FIG. 1 is a diagram of a display panel, which can be installed easily according to an embodiment of the present invention.

Please refer to FIG. 1. FIG. 1 is a diagram of a display panel 10, which can be installed easily according to an embodiment of the present invention. The display panel 10 includes a circuit board 16, a pocket-shaped structure 12, a holder 14, and a display panel 18. The pocket-shaped structure 12 includes a first side wall 121, a second side wall 122, a third side wall 123, a fourth side wall 124, and two support plates 127 and 128. The third side wall 123 and the fourth side wall 124 each has a hole 125 and 126. The support plate 127 is located beside the third side wall 123 and the support plate 128 is located beside the fourth side wall 124. The two support plates 127 and 128 form an empty space 130 with the four side walls 121, 122, 123, and 124. The holder 14 includes a first panel 141, a second panel 142, and two engaging slides 143 and 144. The first panel 141 is used for holding the circuit board 16. The second panel 142 is formed in one side of the first panel 141. The first panel 141 comprises two extension arms 145 and 146, which are respectively formed on two sides of the first panel 141. The two engaging slides 143 and 144 are located at the two extension arms 145 and 146 of the first panel 141 individually. The two extension arms 145 and 146 of the first panel 141 comprise a plurality of bendings 147 and 148. The display panel 18 is installed in one side of the first panel 141 (adjacent to the first panel 141) and coupled to the circuit board 16 for displaying images according to image signals transmitted from the circuit board 16. The display device 10 is an LCD monitor or an LCD television.

Figure 2:
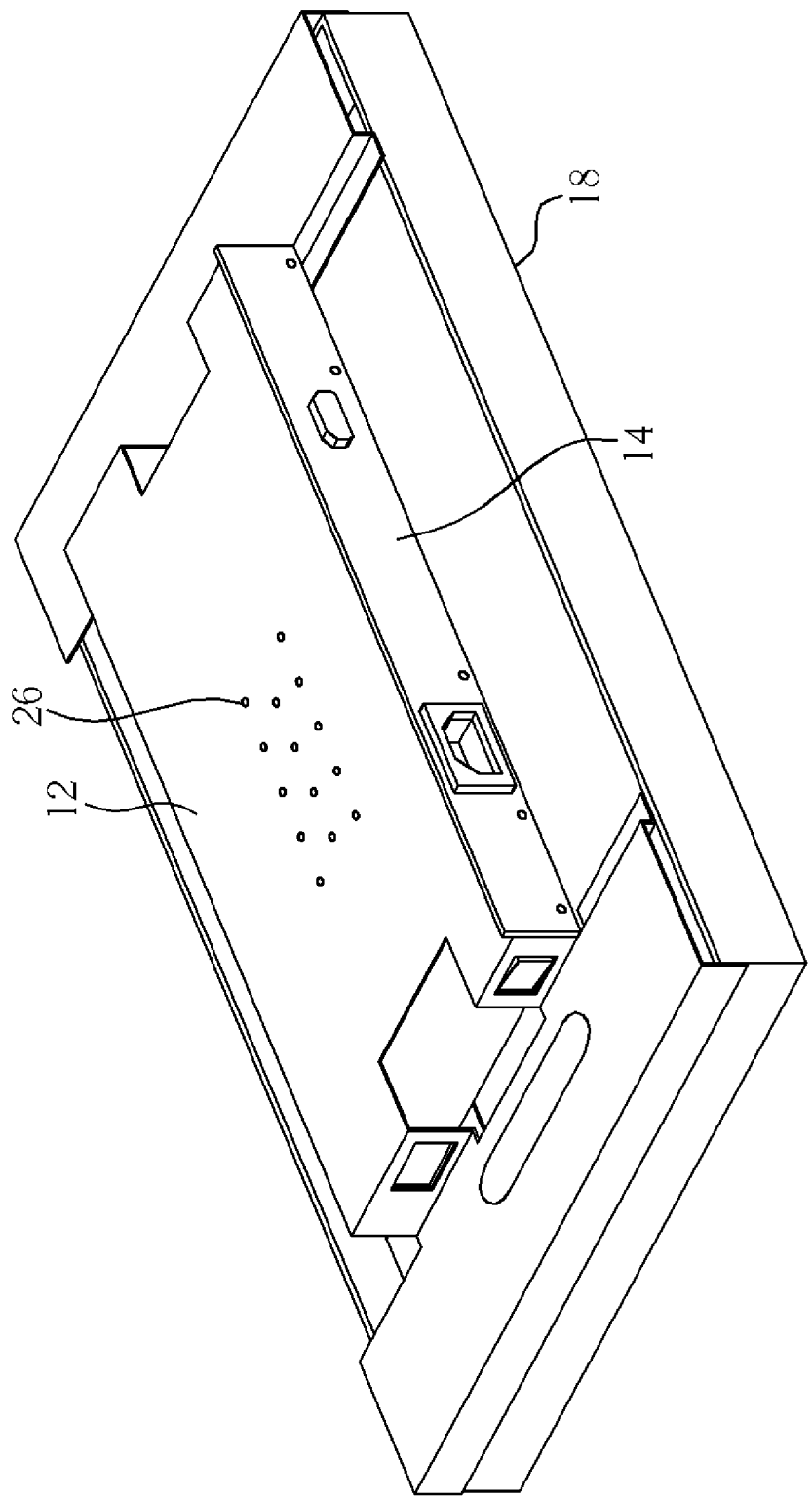
FIG. 2 is a diagram showing the holder stored in the pocket-shaped structure in FIG. 1.

Please refer to FIG. 2 and FIG. 1. FIG. 2 is a diagram showing the holder 14 stored in the pocket-shaped structure 12 in FIG. 1. When the pocket-shaped structure 12 is combined with the holder 14, the empty space 130 can be sealed up essentially by the first panel 141 and the second panel 142 to prevent electromagnetic radiation from leaking out the empty space 130. The first panel 141 is supported on the two support plates 127 and 128, the engaging slide 143 is clamped within the hole 125 of the third side wall 123, and the engaging slide 144 is clamped within the hole 126 of the fourth side wall 124 when the holder 14 is stored in the empty space 130 (inside the pocket-shaped structure 12). When the holder 14 is stored in the empty space 130, a plurality of bendings 147 and 148 of two extension arms 145 and 146 are against the first side wall 121. Furthermore, the first side wall 121 further comprises a plurality of heat-exhaust holes 26, and the plurality of heat-exhaust holes 26 are located on top of the circuit board 16 for drawing out hot air easily when the holder 14 is stored in the pocket-shaped structure 12. Besides, the location of the heat-exhaust hole 26 can be installed on the second side wall 122, and the pocket-shaped structure 12 presents a vertical stretch and the heat-exhaust hole 26 is located on top of the circuit board 16 for drawing out hot air easily after the display device 10 combined with a base (not shown in FIG. 2).

Figure 3:
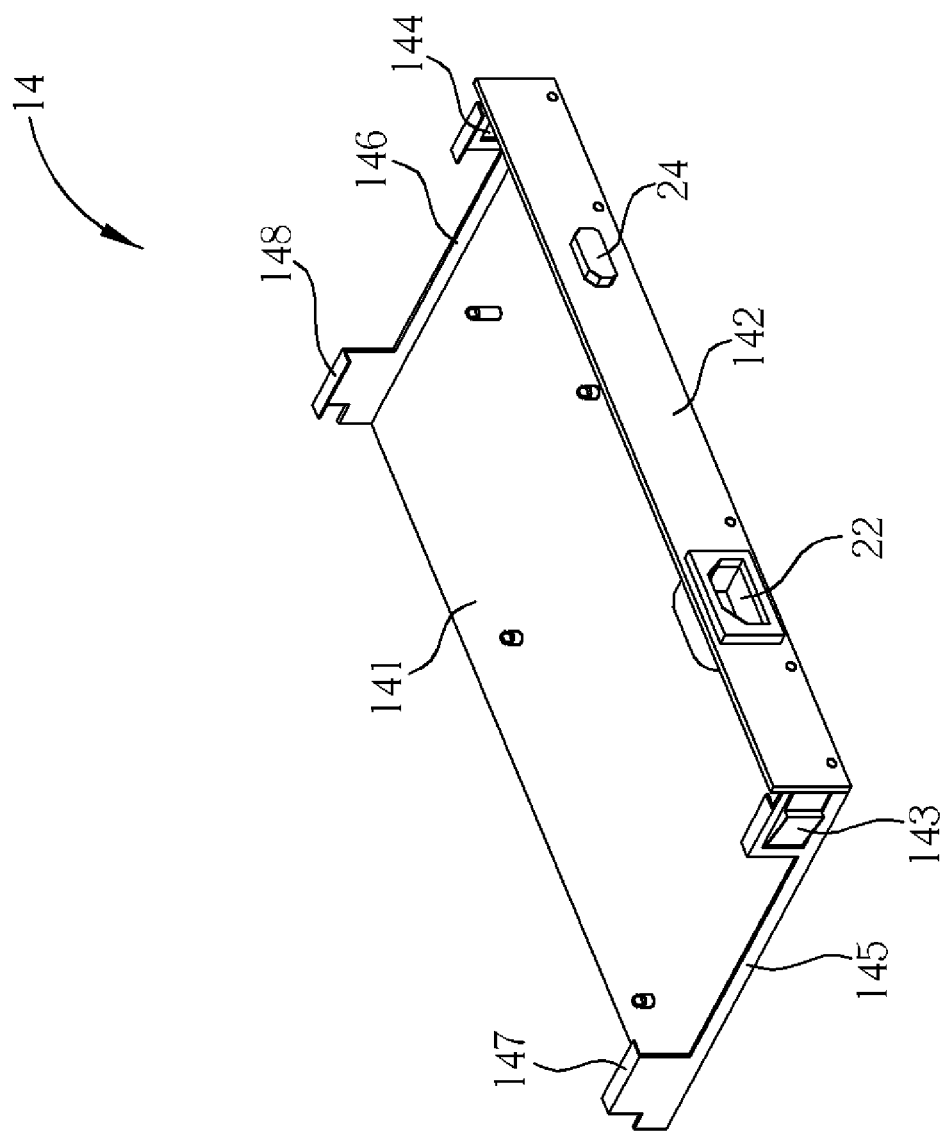
FIG. 3 is a diagram showing the holder in FIG. 1.

Please refer to FIG. 3 and FIG. 1. FIG. 3 is a diagram showing the holder 14 in FIG. 1. The second panel 142 of the holder 14 comprises a power line hole 22 used for containing a power connection, and the second panel 142 further comprises a signal line hole 24 used for containing a signal connection. Due to the power line hole 22 and the signal line hole 24 being installed on the second panel 142, a power line can be coupled to the circuit board 16 through the power line hole 22 and a signal line can be coupled to the circuit board 16 through the signal line hole 24.

Figure 4:
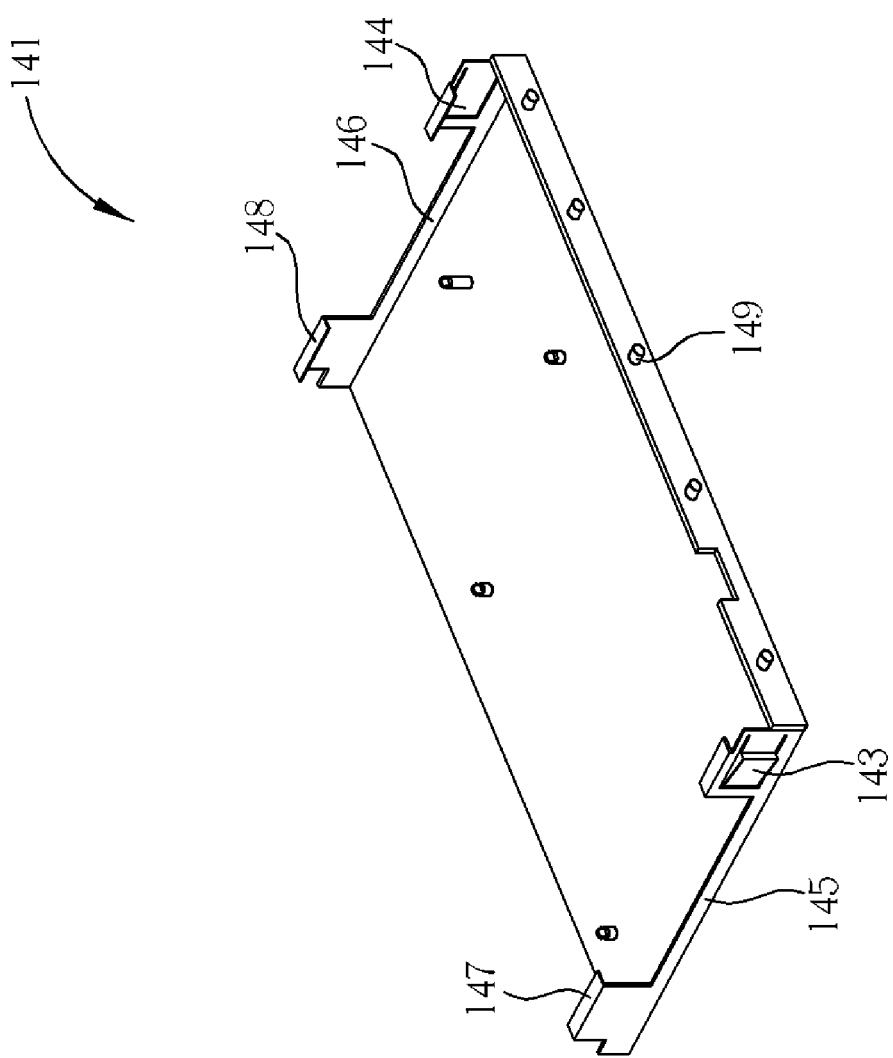
FIG. 4 is a diagram showing the first panel and the two engaging slides in FIG. 3.
Figure 5:
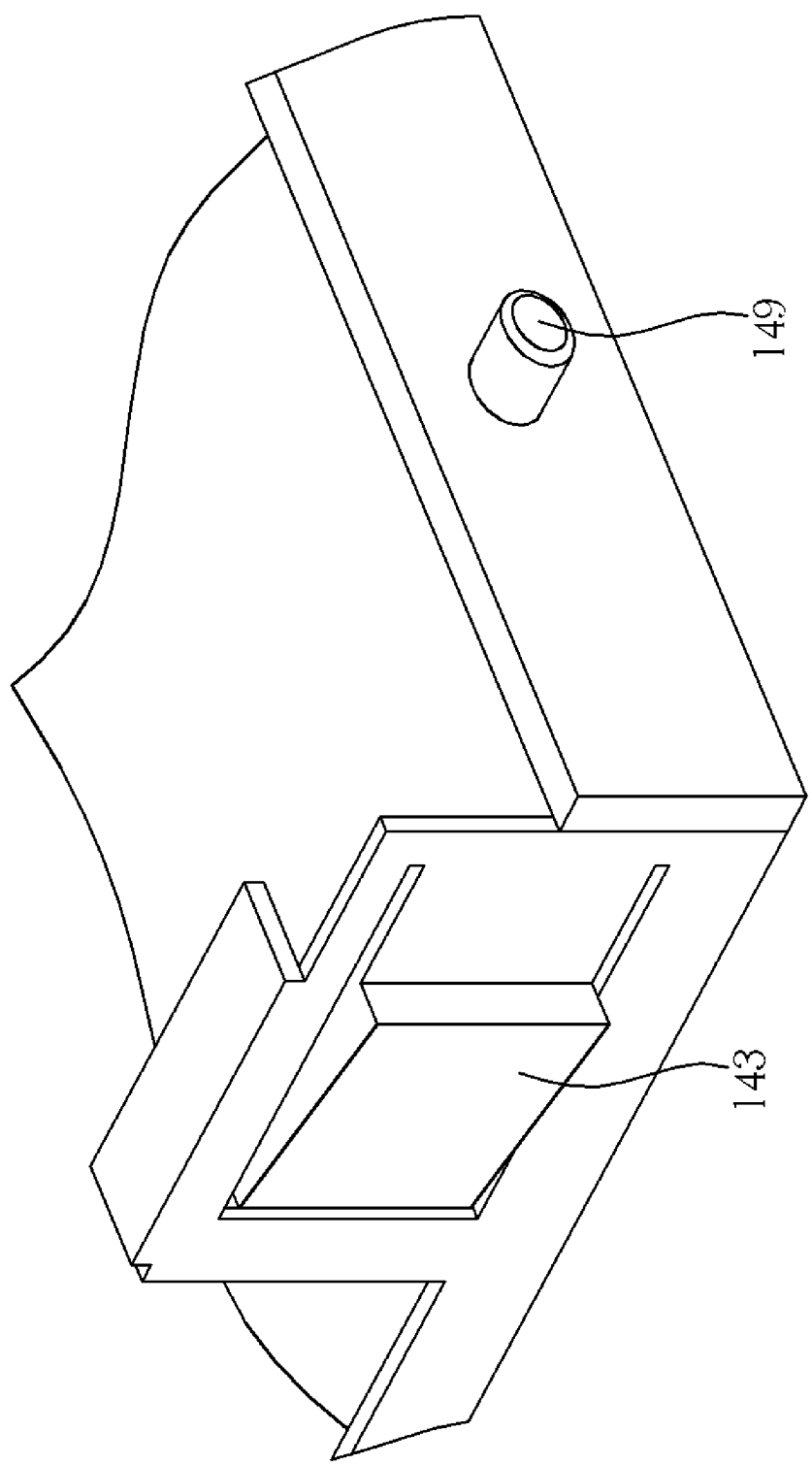
FIG. 5 is an enlarged diagram of the engaging slide and the hot melt pole in FIG. 4.

Please refer to FIG. 3 to FIG. 5. FIG. 4 is a diagram showing the first panel 141 and the two engaging slides 143 and 144 in FIG. 3, and FIG. 5 is an enlarged diagram of the engaging slide 143 and a hot melt pole 149 in FIG. 4. The two engaging slides 143 and 144 are individually located at two extension arms 145 and 146 of the first panel 141. The first panel 141 comprises a plurality of hot melt poles 149 used for fixing the second panel 142 on the first panel 141. The plurality of hot melt poles 149 and the first panel 141 are monolithically formed. The holder 14 comprises plastic materials.

Figure 6:
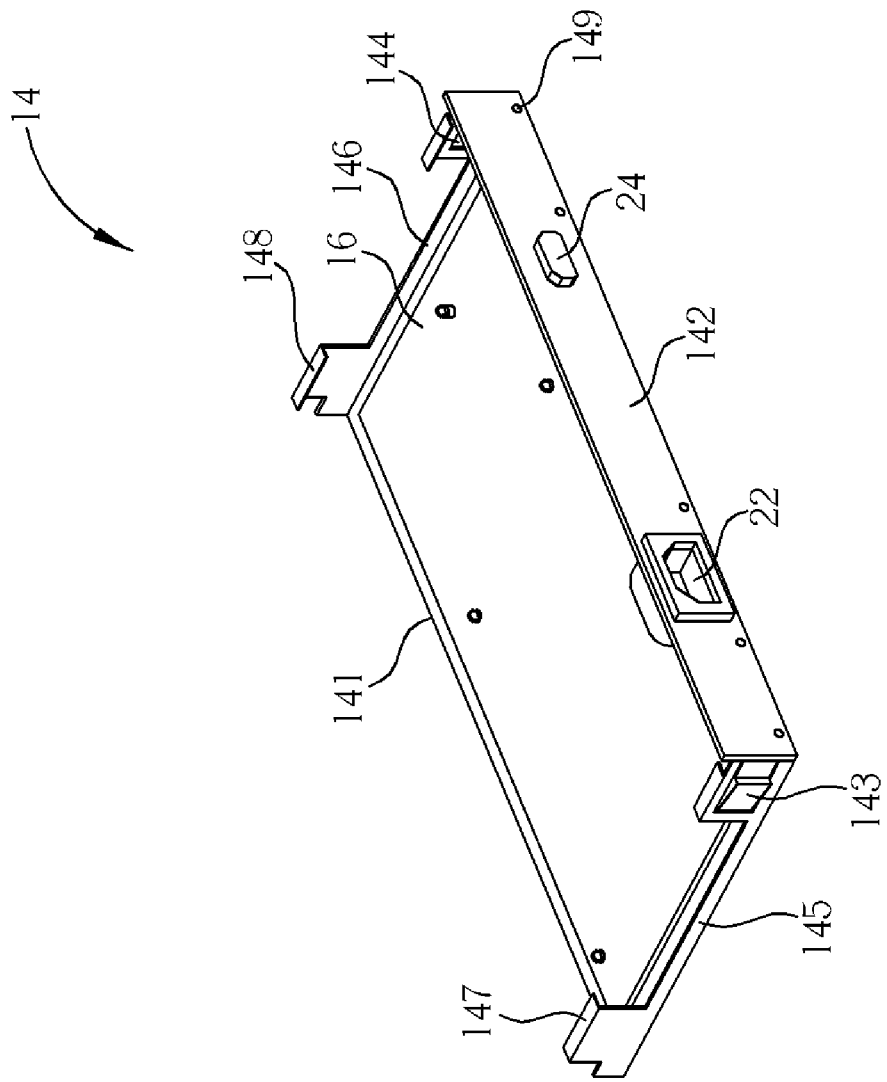
FIG. 6 is a diagram showing the circuit board and the holder in FIG. 1.

Please refer to FIG. 6 and FIG. 1. FIG. 6 is a diagram showing the circuit board 16 and the holder 14 in FIG. 1. The difference between FIG. 6 and FIG. 3 is that the circuit board 16 is installed on the first panel 141 of the holder 14 in FIG. 6.

The above-mentioned embodiments illustrate but do not limit the present invention. The above-mentioned display device 10 can be an LCD monitor or an LCD television and is not limited to this. Furthermore, the amount of the bendings 147 and 148 located at the top of two extension arms 145 and 146 is not limited to two but also extends to a larger plurality of bendings.

In conclusion, the present invention provides a display device 10 which can be installed easily. The first panel 141 is supported on the two support plates 127 and 128, and the two engaging slides 143 and 144 are clamped within the holes 125 and 126 of the third side wall 123 and the fourth side wall 124 when the holder 14 is stored in the empty space 130. The holder 14 is fixed inside the pocket-shaped structure 12 through the engaging slides 143 and 144. As a result, no more screws are needed to fix the holder 14, which can reach an objective of saving cost. The plurality of bendings 147 and 148 of the two extension arms 145 and 146 are used for being against the first side wall 121 to make the holder 14 enter the pocket-shaped structure 12 smoothly as well as fix the holder 14. It is convenient to pull out the circuit board 16 through the application of the two support plates 127 and 128, which saves time and simplifies matters when users process operations of dismantling or exchanging electronic elements. In addition, the holder 14 comprises plastic materials and the second panel 142 can be fixed on the first panel 141 through the plurality of hot melt poles 149 of the first panel 141. Furthermore, the second panel 142 comprises the power line hole 22 for containing the power connection and the signal line hole 24 for containing the signal connection. Due to the power line hole 22 and the signal line hole 24 being installed on the second panel 142, the power line can be coupled to the circuit board 16 through the power line hole 22 and the signal line can be coupled to the circuit board 16 through the signal line hole 24.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display device, comprising:
   a circuit board;
   a pocket-shaped structure comprising:
      a first side wall, a third side wall, and a fourth side wall, the third side wall having a hole; and
      two support plates located beside the third side wall and the fourth side wall and forming an empty space with the three side walls, the pocket-shaped structure having an opening communicating the empty space;
   a holder comprising:
      a first panel used for holding the circuit board, the first panel comprising an extension arms; and
      an engaging slides located at the two extension arm; and
   a display panel fixed on the pocket-shaped structure and electrically coupled to the circuit board;
   wherein the holder is locked and stored in the empty space when the engaging slide is clamped within the hole;
   wherein the holder and circuit board are capable of being removed from the empty space through the opening when the display panel is still fixed on the pocket-shaped structure, but the engaging slide is removed from the hole.

2. The display device of claim 1, wherein the extension arm of the first panel comprises a plurality of bendings used for being against the first side wall when the holder is stored in the empty space.

3. The display device of claim 1, wherein the holder further comprises a second panel, and the second panel covers the opening when the pocket-shaped structure combined with the holder and the engaging slide is clamped within the hole.

4. The display device of claim 1, wherein the first panel comprises a plurality of hot melt poles used for fixing the second panel on the first panel.

5. The display device of claim 4, wherein the plurality of hot melt poles and the first panel are monolithically formed.

6. The display device of claim 1, wherein the holder comprises plastic materials.

7. The display device of claim 3, wherein the display device further comprises a power connection coupled to the circuit board, and the second panel comprises a hole for containing the power connection.

8. The display device of claim 3, wherein the display device further comprises a signal connection coupled to the circuit board, and the second panel comprises a hole for containing the signal connection.

9. The display device of claim 1, wherein the first side wall comprises a heat-exhaust hole used for drawing out thermal energy generated by the circuit board.

10. A display device, comprising:
    a circuit board;
    a pocket-shaped structure comprising:
       a rear side wall, a left side wall, and a right side wall, one of the left and right side wall having a hole; and
       two support plates located beside the left side wall and the right side wall and forming an empty space with the three side walls, the pocket-shaped structure having an bottom opening communicating the empty space;
    a holder comprising:
       a first panel for holding the circuit board;
       an extension arm; and
       an engaging slide located at the extension arm; and
    a display panel fixed on the pocket-shaped structure and electrically coupled to the circuit board;

wherein the holder is locked and stored in the empty space when the engaging slide is clamped within the hole; and wherein the holder and circuit board are capable of being removed from the empty space through the bottom opening when the display panel is still fixed on the pocket-shaped structure but the engaging slide is removed from the hole.

11. The display device of claim 10, wherein the holder further comprises a second panel, the second panel covers the bottom opening when the pocket-shaped structure combined with the holder and the engaging slide is clamped within the hole.

12. The display device of claim 11, wherein the display device further comprises a power connection coupled to the circuit board, and the second panel comprises a hole for containing the power connection.

13. The display device of claim 11, wherein the display device further comprises a signal connection coupled to the circuit board, and the second panel comprises a hole for containing the signal connection.

* * * * *